United States Patent
Chae

(10) Patent No.: US 7,388,470 B2
(45) Date of Patent: Jun. 17, 2008

(54) COMPARATOR HAVING SMALL SIZE AND IMPROVED OPERATING SPEED

(75) Inventor: Kwan-Yeob Chae, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 107 days.

(21) Appl. No.: 11/348,817

(22) Filed: Feb. 7, 2006

(65) Prior Publication Data

US 2006/0176206 A1  Aug. 10, 2006

(30) Foreign Application Priority Data

Feb. 7, 2005   (KR) ...................... 10-2005-0011441

(51) Int. Cl.
 *G06F 7/02* (2006.01)
(52) U.S. Cl. ..................... 340/146.2; 326/95
(58) Field of Classification Search ..................... None
See application file for complete search history.

(56) References Cited

U.S. PATENT DOCUMENTS

| | | | | |
|---|---|---|---|---|
| 5,471,188 A | * | 11/1995 | Chappell et al. | 340/146.2 |
| 5,881,076 A | * | 3/1999 | Murray | 714/800 |
| 5,910,762 A | * | 6/1999 | Kurotsu | 340/146.2 |
| 6,054,918 A | * | 4/2000 | Holst | 340/146.2 |
| 6,300,769 B1 | | 10/2001 | Phan | 324/537 |
| 6,456,116 B1 | * | 9/2002 | Coppin | 326/95 |
| 6,686,776 B2 | * | 2/2004 | Sakata et al. | 326/95 |
| 6,952,118 B2 | * | 10/2005 | Jamshidi et al. | 326/98 |
| 2006/0038588 A1 | * | 2/2006 | Chu et al. | 326/98 |

FOREIGN PATENT DOCUMENTS

| | | |
|---|---|---|
| JP | 11-239054 | 8/1999 |
| KR | 100212145 | 5/1999 |
| KR | 100261865 | 4/2000 |

OTHER PUBLICATIONS

English Abstract for Publication No. 100261865.
English Abstract for Publication No. 100212145.

* cited by examiner

*Primary Examiner*—Tuan T Lam
(74) *Attorney, Agent, or Firm*—F. Chau & Associates, LLC

(57) ABSTRACT

A comparator having a small number of logic circuits and an improved operating speed is provided, where the comparator includes m number of bit comparators, each connected between a first node and a second node, comparing each corresponding bit between the first data and the second data, and connecting or disconnecting the first node and the second node, a charge unit connected between the first node and a first voltage and charging the first node with the first voltage, and a power connection controller disconnecting the second node and a second voltage in a first mode in response to a predetermined control signal and connecting the second node and the second voltage in a second mode, wherein the first node is charged with the first voltage in the first mode and the voltage level of the first node is output as a comparison result in the second mode.

10 Claims, 7 Drawing Sheets

COMPARATOR HAVING SMALL SIZE AND IMPROVED OPERATING SPEED

CROSS-REFERENCE TO RELATED APPLICATION

This application claims foreign priority under 35 U.S.C. § 119 to Korean Patent Application No. 10-2005-0011441, filed on Feb. 7, 2005, in the Korean Intellectual Property Office, which is incorporated herein in its entirety by reference.

BACKGROUND OF THE INVENTION

1. Field of the Invention

The present disclosure relates to comparators, and more particularly, to comparators having reduced size and improved operating speed.

2. Description of the Related Art

A comparator is a circuit device for determining whether two pieces of data, each including a plurality of bits, are identical to each other. The comparator may be used in a circuit for determining whether two pieces of data are identical to each other, a circuit for detecting 0 from digital data, a built-in self test (BIST) circuit, and the like.

FIG. 1 is a circuit diagram of a conventional 8-bit comparator 100. Referring to FIG. 1, the conventional 8-bit comparator 100 compares two pieces of 8-bit data, A [7:0] and B [7:0], and outputs 0 if A [7:0] and B [7:0] are identical to each other and 1 if A [7:0] and B [7:0] are different from each other. The conventional 8-bit comparator 100 includes eight XOR gates, four inversion AND gates, two inversion OR gates, and another inversion AND gate. The eight XOR gates perform an XOR-operation of bits corresponding to the two pieces of 8-bit data A [7:0] and B [7:0]. The four inversion AND gates each perform an inversion AND-operation of outputs of two of the XOR gates of the eight XOR gates. The two inversion OR gates each perform the inversion OR-operation of outputs of two inversion AND gates of the four inversion AND gates. The inversion AND gate performs the inversion AND-operation of outputs of the two inversion OR gates.

The conventional 8-bit comparator 100 outputs 0 if all the bits corresponding to the two pieces of 8-bit data A [7:0] and B [7:0] are identical to one another, and 1 if any one of the bits corresponding to the same bit position in the two pieces of 8-bit data A [7:0] and B [7:0] is different from one another. That is, the conventional 8-bit comparator 100 outputs 0 if the two pieces of 8-bit data A [7:0] and B [7:0] are identical to each other and 1 if the two pieces of 8-bit data A [7:0] and B [7:0] are different from each other.

FIG. 2 is a circuit diagram of a conventional 64-bit comparator 200 using the 8-bit comparator shown in FIG. 1. Several 8-bit comparators are used to compare data having more than 8 bits. For example, 64-bit data can be compared using eight 8-bit comparators. The conventional 64-bit comparator 200 compares two pieces of 64-bit data A [63:0] and B [63:0] and, unlike the 8-bit comparator 100, outputs 1 if A [63:0] and B [63:0] are identical to each other and 0 if A [63:0] and B [63:0] are different from each other. The conventional 64-bit comparator 200 includes eight 8-bit comparators, four inversion OR gates, two inversion AND gates, and an inversion OR gate. The four inversion OR gates perform an inversion OR-operation of outputs of two 8-bit comparators of the eight 8-bit comparators. The two inversion AND gates perform an inversion AND-operation of outputs of two XOR gates of the four inversion OR gates. The inversion OR gate performs the inversion OR-operation of outputs of two exclusive AND gates.

Each conventional 8-bit comparator 100 outputs 0 if the two pieces of 8-bit data A [7:0] and B [7:0] are identical to each other and 1 if the two pieces of 8-bit data A [7:0] and B [7:0] are different from each other. The conventional 64-bit comparator 200 outputs 1 if the conventional 8-bit comparators 100 each output only 0, and 0 if any of the conventional 8-bit comparators 100 outputs a 1. That is, the conventional 64-bit comparator 200 outputs 1 if the two pieces of 64-bit data A [63:0] and B [63:0] are identical to each other, and 0 if the two pieces of 64-bit data A [63:0] and B [63:0] are different from each other.

The conventional 64-bit comparator 200 needs sixty-four XOR gates, forty-two inversion AND gates, and twenty-one inversion OR gates. A lot of logic circuits are required to compare data having more than 64 bits. Thus, a conventional comparator has a large size.

Meanwhile, a time delay required to output results of the conventional 64-bit comparator 200 is Dxor+3Dnand+3Dnor (Dxor is a time delay in an XOR gate, Dnand is a time delay in an inversion AND gate, and Dnor is a time delay in the XOR gate). Thus, the conventional comparator has a relatively slow operating speed.

It is desirable to minimize the size and improve the operating speed of a semiconductor circuit. Therefore, the size of a comparator circuit should be reduced using a smaller number of logic circuits, and the operating speed of the comparator circuit should be improved.

SUMMARY OF THE INVENTION

The present disclosure provides a comparator having a small number of logic circuits and transistors that reduces the size of a circuit and improves the operating speed of the circuit.

According to an embodiment of the present disclosure, there is provided a comparator for comparing m-bit first data and m-bit second data. The comparator comprises m number of bit comparators, each connected between a first node and a second node, comparing each corresponding bit between the first data and the second data, and connecting or disconnecting the first node and the second node; a charge unit connected between the first node and a first voltage and charging the first node with the first voltage; and a power connection controller disconnecting the second node and a second voltage in a first mode in response to a predetermined control signal and connecting the second node and the second voltage in a second mode, wherein the first node is charged with the first voltage in the first mode and the voltage level of the first node is output as a comparison result in the second mode.

According to another embodiment of the present disclosure, there is provided a comparator for comparing mXn-bit first data and mXn-bit second data using the n number of m-bit comparators. The comparator comprises a charge unit connected between a first node and a first voltage and charging the first node with the first voltage; and n number of comparators connected between a second voltage and the first node and connecting or disconnecting the first node and the second voltage in response to the output of the n number of m-bit comparators, wherein the voltage level of the first node is output as a comparison result.

BRIEF DESCRIPTION OF THE DRAWINGS

The above and other features and advantages of the present disclosure will become more apparent by describing in detail exemplary embodiments thereof with reference to the attached drawings, in which.

DETAILED DESCRIPTION OF PREFERRED EMBODIMENTS

Figure 1:
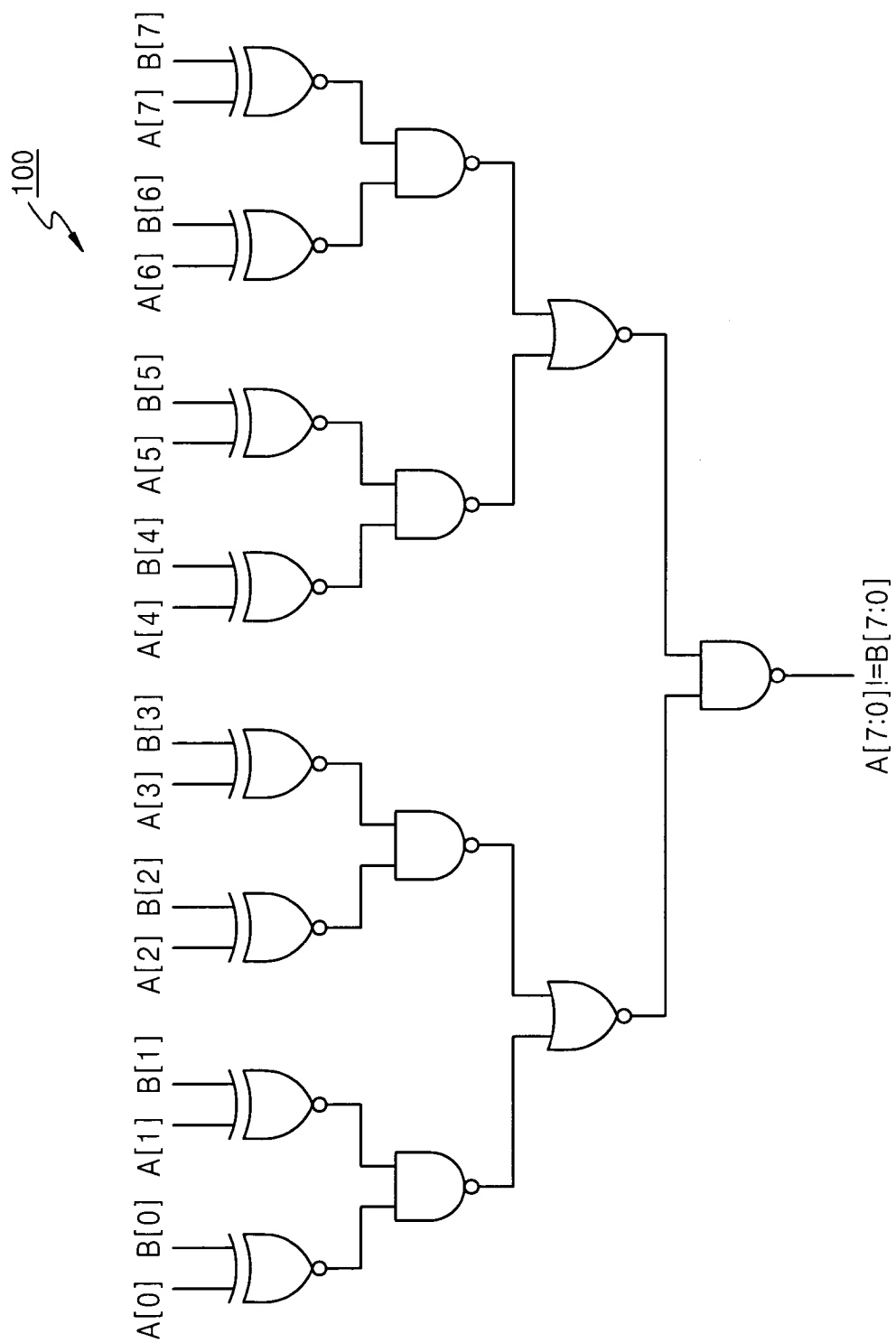
FIG. 1 is a circuit diagram of a conventional 8-bit comparator.
Figure 2:
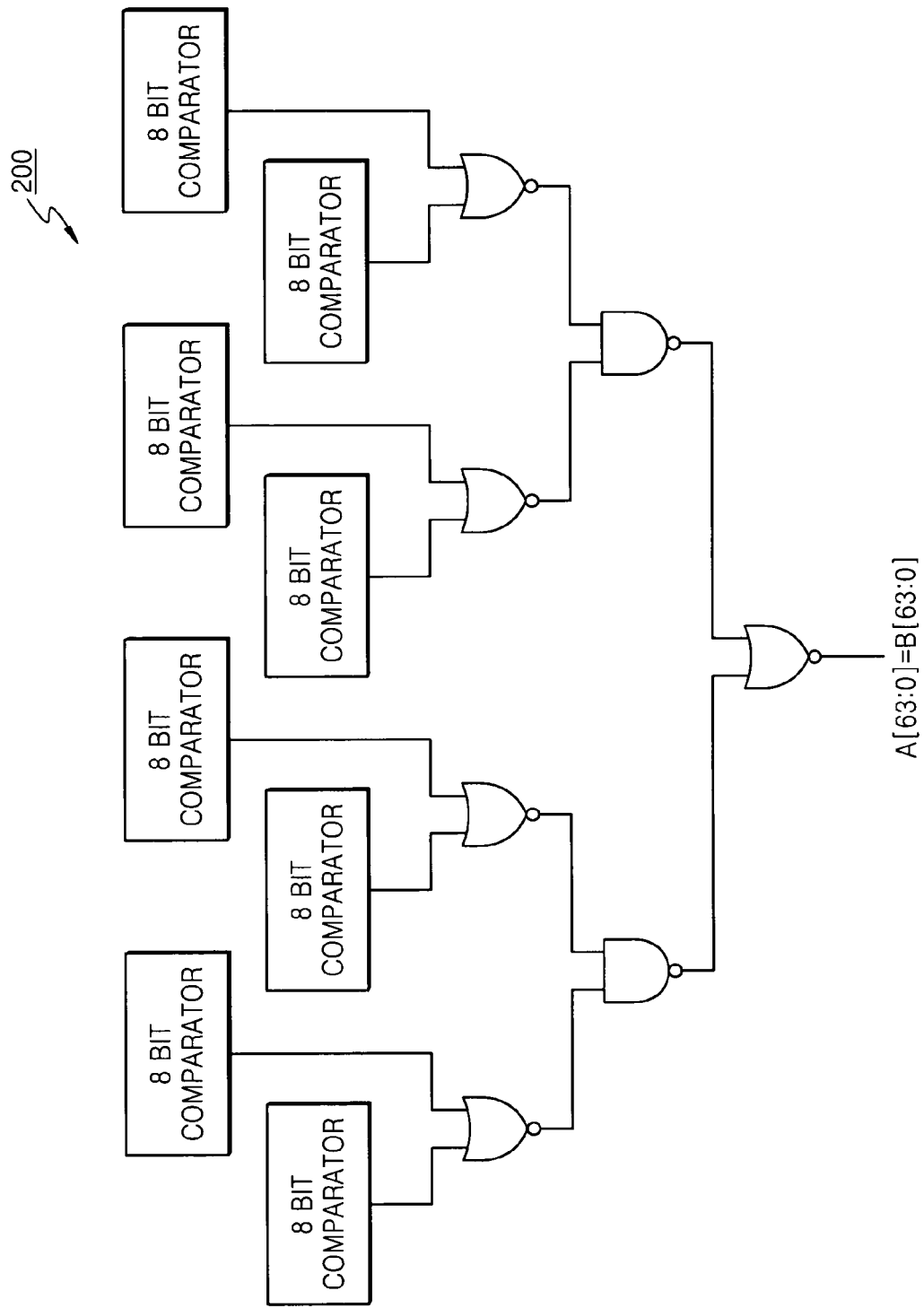
FIG. 2 is a circuit diagram of a conventional 64-bit comparator using the 8-bit comparator shown in FIG. 1.

In order to fully understand advantages attained by embodiments of the present disclosure, the accompanying drawings illustrating exemplary embodiments of the present disclosure and details thereof are referenced and described. Hereinafter, exemplary embodiments of the present disclosure will be described in detail with reference to the accompanying drawings. In the drawings, like reference numerals may be used to refer to like elements.

Figure 3:
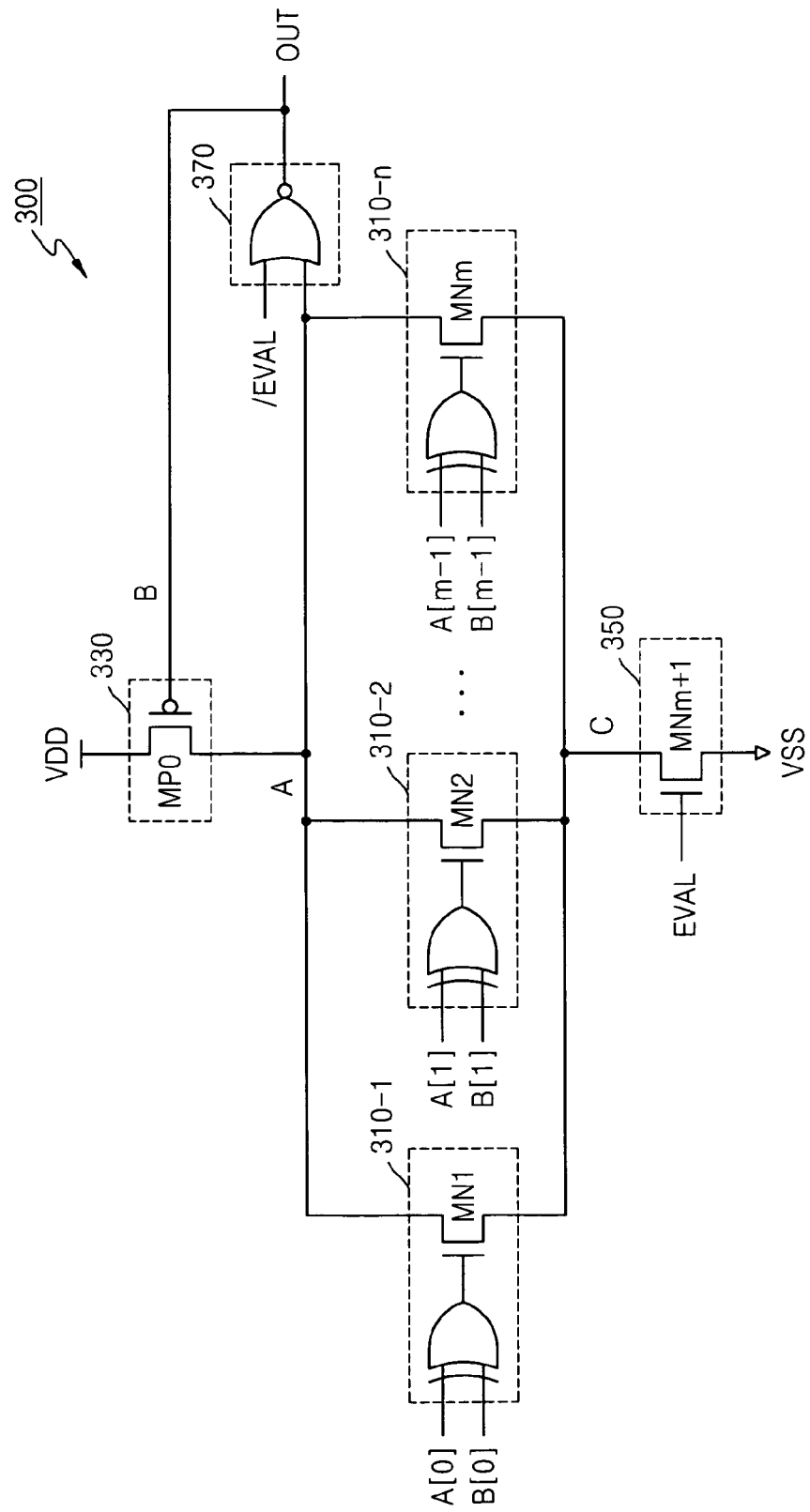
FIG. 3 is a circuit diagram of an m-bit comparator according to an embodiment of the present disclosure.

FIG. 3 is a circuit diagram of an m-bit comparator 300 according to an embodiment of the present disclosure. Referring to FIG. 3, the m-bit comparator 300 compares m-bit first data A[m-1:0] and m-bit second data B[m-1:0] and outputs 1 if the first and second data are different from each other and 0 if the first and second data are identical to each other.

The m-bit comparator 300 includes the m number of bit comparators 310-1 through 310-m, a charge unit 330, and a power connection controller 350. The m-bit comparator 300 may further include a charge control & output unit 370.

The m number of bit comparators 310-1 through 310-m are connected between a first node A and a second node C. The m number of bit comparators 310-1 through 310-m compare bits corresponding to the first and second data and connect or disconnect the first node A and the second node C.

The charge unit 330 is connected between the first node A and a first voltage VDD. The charge unit 330 charges the first node A with the first voltage VDD. The first voltage VDD is a power voltage that pre-charges the first node A.

The power connection controller 350 operates in response to a control signal EVAL. The power connection controller 350 disconnects the second node C and a second voltage VSS in a first mode and connects the second node C and the second voltage VSS in a second mode.

The second voltage VSS is a ground voltage. The first mode is a pre-charge mode when the control signal EVAL is 0 and the second mode is an evaluation mode when the control signal EVAL is 1. Therefore, the first node A is pre-charged with the power voltage VDD in the first mode and outputs the voltage level as a comparison result in the second mode.

The m number of bit comparators 310-1 through 310-m include an XOR gate and comparison transistors MN1 through MNm. The XOR gate performs an XOR-operation of each bit A[0] and B[0], A[1] and B[1] . . . A[m-1] and B[m-1] corresponding to the first and second data.

The comparison transistors MN1 through MNm are connected between the first node A and the second node C. The comparison transistors MN1 through MNm operates in response to the output of the XOR gate that is input in a gate. The comparison transistors MN1 through MNm are NMOS transistors.

The charge unit 330 is connected between the first voltage VDD and the first node A. The charge unit 330 is a charge transistor MP0 that operates in response to a predetermined signal that is input in the gate. The charge transistor MP0 is a PMOS transistor.

The charge unit 330 may operate in response to a predetermined bias voltage that is input to the gate. In this case, the first node A is always pre-charged.

The power connection controller 350 is connected between the second node C and the second voltage VSS. The power connection controller 350 is a connection control transistor MNm+1 in response to the control signal EVAL that is input to the gate. The connection control transistor MNm+1 is an NMOS transistor.

The charge control & output unit 370 outputs an inversion comparison result OUT in response to an inversion control signal /EVAL and the voltage level of the first node A. The charge control & output unit 370 feeds back the output inversion comparison result OUT to the charge unit 330 to control the operation of the charge unit 330. The charge control & output unit 370 is the inversion OR gate for performing the inversion OR-operation of the inversion control signal /EVAL and the voltage level of the first node A. The operation of the m-bit comparator 300 will now be described with reference to FIG. 3.

The m-bit comparator 300 according to an embodiment of the present disclosure operates in the pre-charge mode or the evaluation mode in response to the control signal EVAL. The m-bit comparator 300 operates in the pre-charge mode when the control signal EVAL is at a first level (a low level) or in the evaluation mode when the control signal EVAL is in a second level (a high level).

The operation of the m-bit comparator 300 in the pre-charge mode will now be described. When the control signal EVAL is at the low level, the connection control transistor MNm+1 is turned off. That is, the connection control transistor MNm+1 prevents a direct current path from generating from the power voltage VDD to the ground voltage VSS in the pre-charge mode.

When the control signal EVAL is at the low level, an output node B is also at the low level and the charge transistor MP0 is turned on. The first node A is pre-charged at the high level.

For reference, the charge transistor MP0 may always pre-charge the first node A in response to a predetermined power voltage. However, the m-bit comparator 300 feeds back the output of the charge control & output unit 370 to control the charge transistor MP0 in order to prevent the first node A from being in a high impedance state in the evaluation mode.

The operation of m-bit comparator 300 in the evaluation mode will now be described. When the control signal EVAL is at the high level in the evaluation mode, the connection control transistor MNm+1 is turned on.

Meanwhile, the comparison transistors MN1 through MNm are turned on or off in response to the comparison results, i.e., the results of the XOR operation, for each bit A[0] and B[0], A[1] and B[1] . . . A[m-1] and B[m-1]

corresponding to the first and second data. The first node A is discharged at the low level when the comparison transistors MN1 through MNm are turned on and maintained at the high level when the comparison transistors MN1 through MNm are turned off. In this case, if the first data A[m-1:0] and the second data B[m-1:0] are identical to each other, since each output of the XOR gates is at the low level, the comparison transistors MN1 through MNm are turned off.

The voltage level of the first node A is maintained at the high level and the voltage level of the output node B is maintained at the low level, so that the charge transistor MP0 keeps turning on, thereby preventing the first node A from being in the high impedance state. If the first data A[m-1:0] and the second data B[m-1:0] are different from each other, since more than one of the comparison transistors MN1 through MNm are turned on, the first node A is discharged from the high level to the low level.

Since the voltage level of the output node B is changed to the high level and the charge transistor MP0 is turned off, a static current is prevented from the charge transistor. That is, the output OUT of the m-bit comparator 300 is at the low level in the pre-charge mode, and at the low level when the first data and the second data are identical to each other and at the high level when the first data and the second data are different from each other in the evaluation mode.

Figure 4:
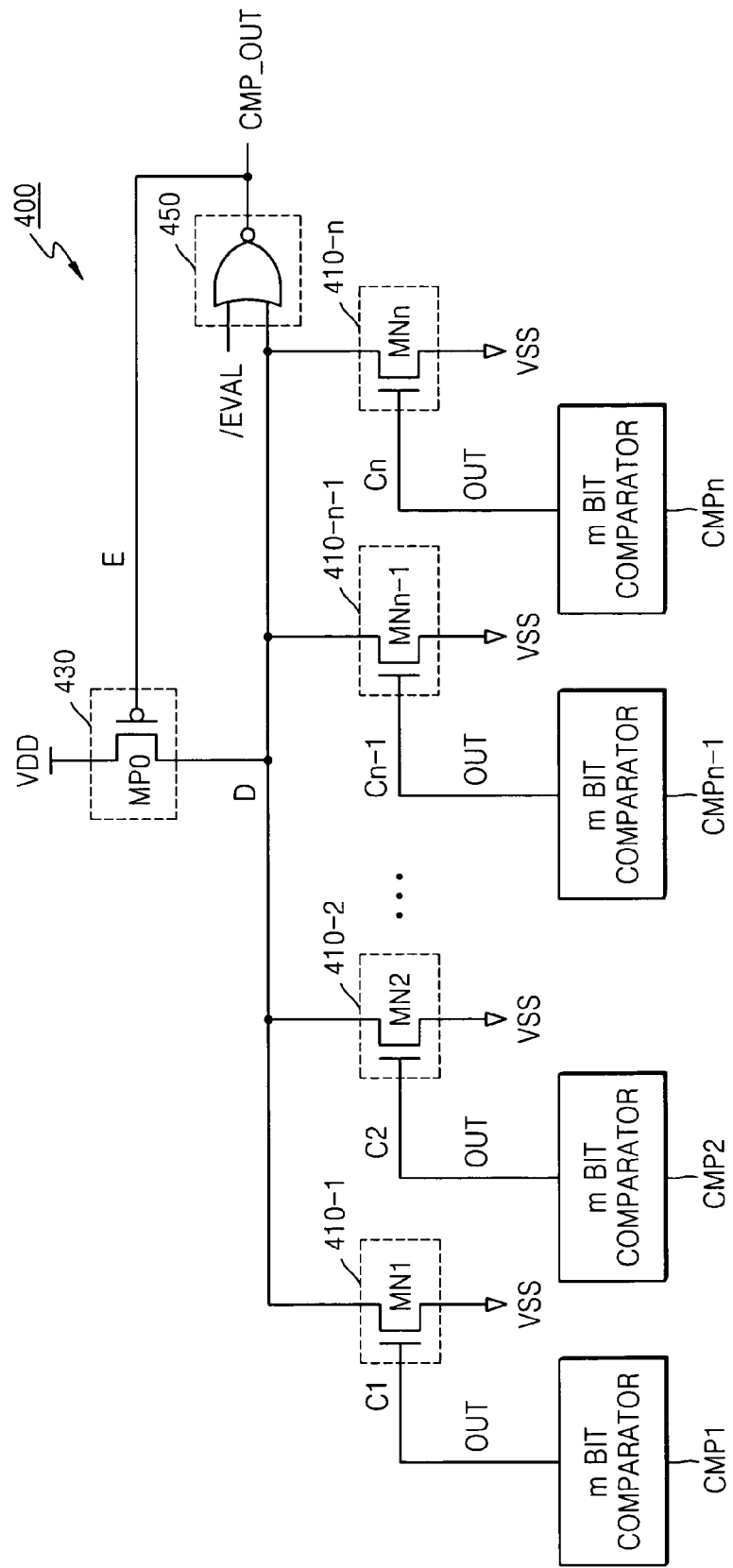
FIG. 4 is a circuit diagram of an mXn-bit comparator using the m-bit comparator shown in FIG. 3.

FIG. 4 is a circuit diagram of an mXn-bit comparator 400 using the m-bit comparator shown in FIG. 3. Referring to FIG. 4, the mXn-bit comparator 400 compares first mXn-bit data and second mXn-bit data using m-bit comparators CMP1 through CMPn and outputs 1 on CMP_OUT if the first mXn-bit data and the second mXn-bit data are different from each other and outputs 0 on CMP_OUT if the first mXn-bit data and the second mXn-bit data are identical to each other.

The mXn-bit comparator 400 includes a charge unit 430 and n number of comparators 410-1 through 410-n and may further include a charge control & output unit 450. The charge unit 430 is connected between a first node D and a first voltage VDD and charges the first node D with the first voltage VDD. The first voltage VDD is a power voltage that pre-charges the first node D.

The m number of comparators 410-1 through 410-n are connected between the first node D and a second voltage VSS. The m number of comparators 410-1 through 410-n connect or disconnect the first node D and the second voltage VSS in response to each output of n number of comparators C1 through Cn. The voltage level of the first node D is output as a comparison result.

The second voltage VSS is a ground voltage and the m-bit comparators CMP1 through CMPn are each comparators such as that shown in FIG. 3. Each of the m number of comparators 410-1 through 410-n is connected between the first node D and the second voltage VSS. The m number of comparators 410-1 through 410-n are comparison transistors MN1 through MNn that operate in response to the outputs C1 through Cn of the m-bit comparators CMP1 through CMPn that are input in gates. The comparison transistors MN1 through MNn are NMOS transistors.

The charge unit 430 is connected between the first voltage VSS and the first node D and is a charge transistor MP0 that operates in response to a predetermined signal that is input to a gate. The charge transistor MP0 is a PMOS transistor.

The charge control & output unit 450 outputs an inversion comparison result in response to a control signal /EVAL and the voltage level of the first node D. The charge control & output unit 450 feeds back the output inversion comparison result to the charge unit 430 to control the operation of the charge unit 430.

The mXn-bit comparator 400 operates in a first mode and a second mode in response to the control signal /EVAL. The first mode is a pre-charge mode when the control signal /EVAL is 0 and the second mode is an evaluation mode when the control signal /EVAL is 1. The first node D is pre-charged with the power voltage VSS in the first mode and the power voltage of the first node D is output as a comparison result.

The charge control & output unit 450 is an inversion OR gate for performing an inversion OR-operation of the control signal /EVAL and the power voltage of the first node D. The operation of the mXn-bit comparator 400 will now be described. The output OUT of the m-bit comparators shown in FIG. 3 is at the low level in the pre-charge mode, and at the low level or at the high level in the evaluation mode according to the comparison result.

The outputs C1 through Cn of the m-bit comparators CMP1 through CMPn are at the low level in the pre-charge mode. Since the comparison transistors 410-1 through 410-n are turned off in the pre-charge mode, it is not necessary to disconnect the comparison transistors 410-1 through 410-n and the ground voltage VSS in the pre-charge mode.

Therefore, the mXn-bit comparator 400 does not require the power connection controller 350 shown in FIG. 3.

The mXn-bit comparator 400 has the same structure as that of the m-bit comparator 300 except that the mXn-bit comparator 400 does not include the connection control transistor 350. The other operation of the mXn-bit comparator 400 will not be described.

Figure 5:
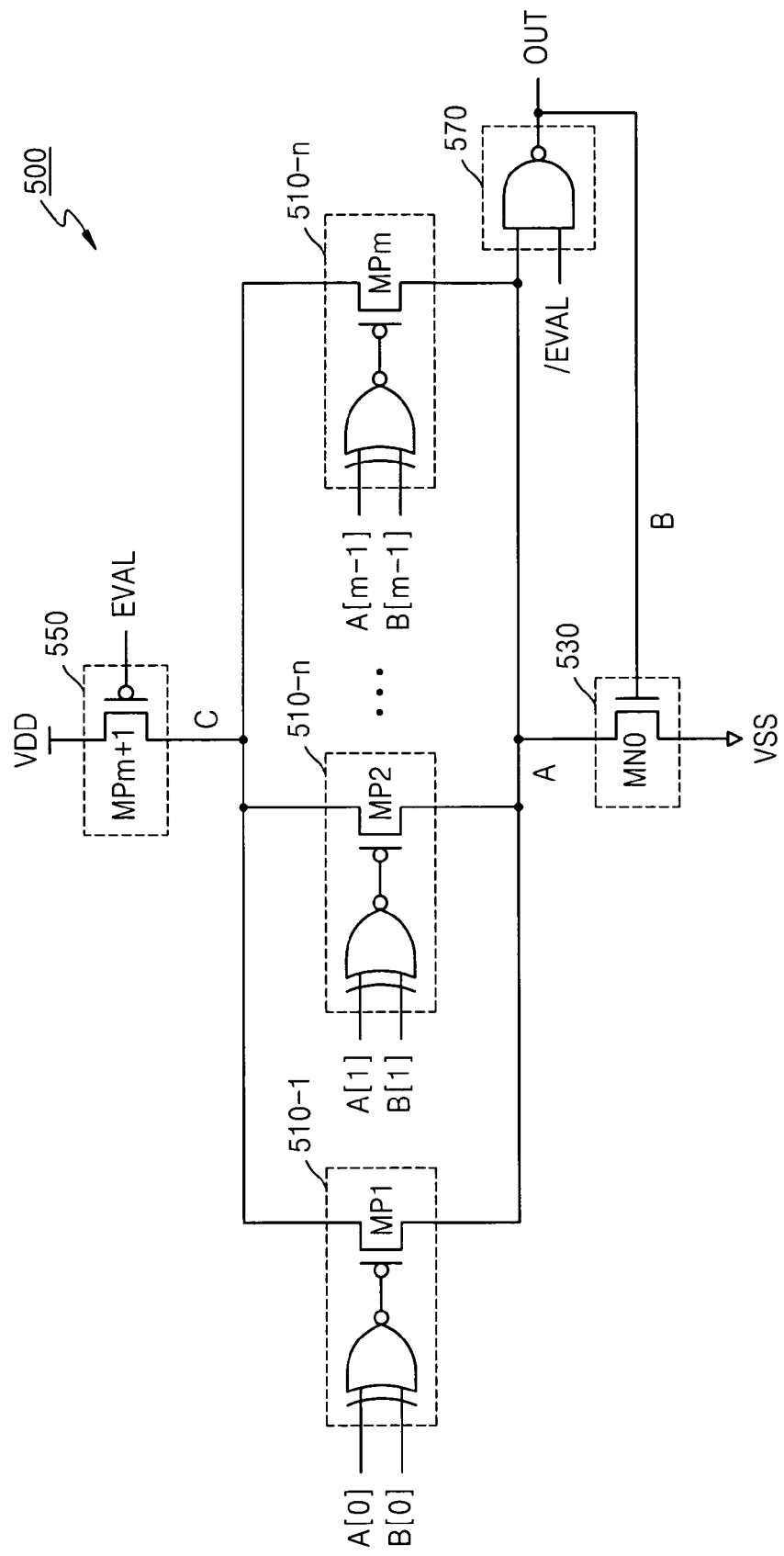
FIG. 5 is a circuit diagram of an m-bit comparator according to another embodiment of the present disclosure.

FIG. 5 is a circuit diagram of an m-bit comparator according to another embodiment of the present disclosure. Referring to FIG. 5, the m-bit comparator 500 compares m-bit first data A[m-1:0] and m-bit second data B[m-1:0] and outputs 0 if the first and second data are different from each other and 1 if the first and second data are identical to each other. The m-bit comparator 300 includes the m number of bit comparators 510-1 through 510-m, a charge unit 530, and a power connection controller 550.

The m-bit comparator 500 may further include a charge control & output unit 570.

The m number of bit comparators 510-1 through 510-m are connected between a first node A and a second node C. The m number of bit comparators 510-1 through 510-m compare bits, e.g., A[1] and B[1] corresponding to the first and second data and connect or disconnect the first node A and the second node C.

The charge unit 530 is connected between the first node A and a first voltage VSS. The charge unit 530 charges the first node A with the first voltage VSS. The first voltage VSS is a ground voltage that discharges the first node A.

The power connection controller 550 operates in response to a control signal EVAL. The power connection controller 550 disconnects the second node C and a second voltage VDD in a first mode and connects the second node C and the second voltage VDD in a second mode.

The second voltage VDD is a power voltage. The first mode is a discharge mode when the control signal EVAL is 1 and the second mode is an evaluation mode when the control signal EVAL is 0. Therefore, the first node A is discharged with the ground voltage VSS in the first mode and outputs the voltage level as a comparison result in the second mode.

The m number of bit comparators 510-1 through 510-m include an inversions XOR gate and comparison transistors MP1 through MPm. The inversions XOR gate performs an inversions XOR-operation of each bit A[0] and B[0], A[1] and B[1] . . . A[m-1] and B[m-1] corresponding to the first and second data.

The comparison transistors MN1 through MNm are connected between the first node A and the second node C. The comparison transistors MP1 through MPm operates in response to the output of the inversion XOR gate that is input in a gate. The comparison transistors MP1 through MPm are PMOS transistors.

The charge unit 530 is connected between the first voltage VSS and the first node A. The charge unit 530 is a charge transistor MN0 that operates in response to a predetermined signal that is input in the gate. The charge transistor MN0 is an NMOS transistor.

The charge unit 530 may operate in response to a predetermined bias voltage (not shown) that is input in the gate. In this case, the first node A is always discharged.

The power connection controller 550 is connected between the second node C and the second voltage VDD. The power connection controller 550 is a connection control transistor MPm+1 in response to the control signal EVAL that is input in the gate. The connection control transistor MPm+1 is a PMOS transistor.

The charge control & output unit 570 outputs an inversion comparison result OUT in response to an inversion control signal /EVAL and the voltage level of the first node A. The charge control & output unit 570 feedbacks the output inversion comparison result OUT to the charge unit 530 to control the operation of the charge unit 530.

The charge control & output unit 370 is the inversion AND gate for performing an inversion AND-operation of the inversion control signal /EVAL and the voltage level of the first node A.

The operation of the m-bit comparator 500 will now be described with reference to FIG. 5. The m-bit comparator 500 according to an embodiment of the present disclosure operates in the pre-charge mode or the evaluation mode in response to the control signal EVAL. The m-bit comparator 500 operates in the discharge mode when the control signal EVAL is at a first level (a high level) or in the evaluation mode when the control signal EVAL is in a second level (a low level).

The operation of the m-bit comparator 500 in the discharge mode will now be described. When the control signal EVAL is at the high level, the connection control transistor MPm+1 is turned off. That is, the connection control transistor MPm+1 prevents a direct current path from generating from the power voltage VDD to the ground voltage VSS in the discharge mode.

When the control signal EVAL is at the high level, an output node B is also at the high level and the charge transistor MN0 is turned on. The first node A is discharged at the low level.

For reference, the charge transistor MN0 may always discharge the first node A in response to a predetermined power voltage. However, the m-bit comparator 500 feedbacks the output of the charge control & output unit 570 to control the charge transistor MN0 in order to prevent the first node A from being in a high impedance state in the evaluation mode.

The operation of m-bit comparator 500 in the evaluation mode will now be described. When the control signal EVAL is at the high level in the evaluation mode, the connection control transistor MPm+1 is turned on.

Meanwhile, the comparison transistors MP1 through MPm are turned on or off in response to the comparison results, i.e., the results of the inversion XOR operation, for each bit A[0] and B[0], A[1] and B[1] . . . A[m-1] and B[m-1] corresponding to the first and second data. The first node A is at the high level when the comparison transistors MP1 through MPm are turned on and at the low level when the comparison transistors MP1 through MPm are turned off.

In this case, if the first data A[m-1:0] and the second data B[m-1:0] are identical to each other, since each output of the inversion XOR gates is at the high level, the comparison transistors MP1 through MPm are turned off.

The voltage level of the first node A is maintained at the low level and the voltage level of the output node B is maintained at the high level, so that the charge transistor MN0 keeps turning on, thereby preventing the firs node A from being in the high impedance state.

If the first data A[m-1:0] and the second data B[m-1:0] are different from each other, since more than one of the comparison transistors MP1 through MPm are turned on, the first node A is from the low level to the high level.

Since the voltage level of the output node B is changed to the low level and the charge transistor MN0 is turned off, a static current is prevented from the charge transistor That is, the output OUT of the m-bit comparator 500 is at the high level in the discharge mode, and at the high level when the first data and the second data are identical to each other and at the low level when the first data and the second data are different from each other in the evaluation mode.

Figure 6:
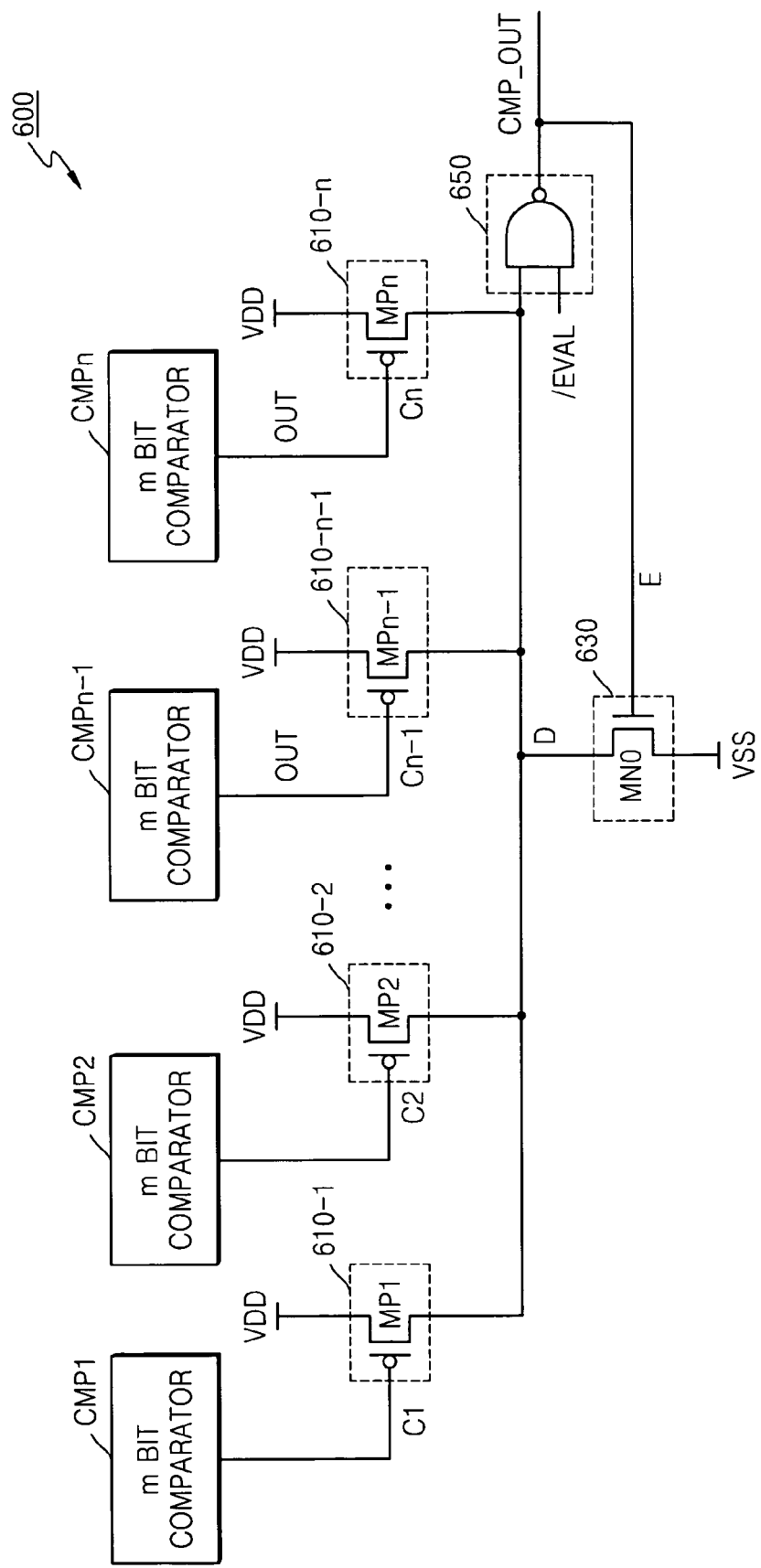
FIG. 6 is a circuit diagram of an mXn-bit comparator using the m-bit comparator shown in FIG. 5.

FIG. 6 is a circuit diagram of an mXn-bit comparator 600 using the m-bit comparator shown in FIG. 5. Referring to FIG. 6, the mXn-bit comparator 600 compares first mXn-bit data and second mXn-bit data using m-bit comparators CMP1 through CMPn and outputs 0 OUT if the first mXn-bit data and the second mXn-bit data are different from each other and outputs 1 CMP_OUT if the first mXn-bit data and the second mXn-bit data are identical to each other.

The mXn-bit comparator 600 includes a charge unit 630 and n number of comparators 610-1 through 610-$n$ and may further include a charge control & output unit 650. The charge unit 630 is connected between a first node D and a first voltage VSS and charges the first node D with the first voltage VSS. The first voltage VSS is a ground voltage that discharges the first node D.

The n number of comparators 610-1 through 610-$n$ are connected between the first node D and a second voltage VDD. The n number of comparators 610-1 through 610-$n$ connect or disconnect the first node D and the second voltage VSS in response to each output of n number of comparators C1 through Cn. The voltage level of the first node D is output as a comparison result.

The second voltage VDD is a power voltage and the m-bit comparators CMP1 through CMPn are comparators such as shown in FIG. 5. Each of the n number of comparators 610-1 through 610-$n$ is connected between the first node D and the second voltage VDD. The n number of comparators 610-1 through 610-$n$ are comparison transistors MP1 through MPn that operate in response to the outputs C1 through Cn of the m-bit comparators CMP1 through CMPn that are input in gates. The comparison transistors MP1 through MPn are PMOS transistors.

The charge unit 630 is connected between the first voltage VSS and the first node D and is a charge transistor MN0 that operates in response to a predetermined signal that is input in a gate. The charge transistor MN0 is an NMOS transistor.

The charge control & output unit 650 outputs an inversion comparison result in response to a control signal /EVAL and the voltage level of the first node D. The charge control & output unit 650 feedbacks the output inversion comparison result to the charge unit 630 to control the operation of the charge unit 630.

The mXn-bit comparator 600 operates in a first mode and a second mode in response to the control signal /EVAL. The first mode is a discharge mode when the control signal /EVAL is 1 and the second mode is an evaluation mode when the control signal /EVAL is 0. The first node D is discharged with the ground voltage VSS in the first mode and the power voltage of the first node D is output as a comparison result.

The charge control & output unit 650 is an inversion AND gate for performing an inversion AND-operation of the control signal /EVAL and the power voltage of the first node D. The operation of the mXn-bit comparator 600 will now be described. The output OUT of the m-bit comparators is at the high level in the discharge mode, and at the low level or at the high level in the evaluation mode according to the comparison result.

The outputs C1 through Cn of the m-bit comparators CMP1 through CMPn are at the high level in the discharge mode. Since the comparison transistors 610-1 through 610-$n$ are turned off in the discharge mode, it is not necessary to disconnect the comparison transistors 610-1 through 610-$n$ and the power voltage VDD in the discharge mode. Therefore, the mXn-bit comparator 600 does not require the power connection controller such as 550 shown in FIG. 5.

The mXn-bit comparator 600 has the same structure as that of the m-bit comparator 500 except that the mXn-bit comparator 600 does not include the connection control transistor 650. The other operation of the mXn-bit comparator 600 will not be described.

Figure 7:
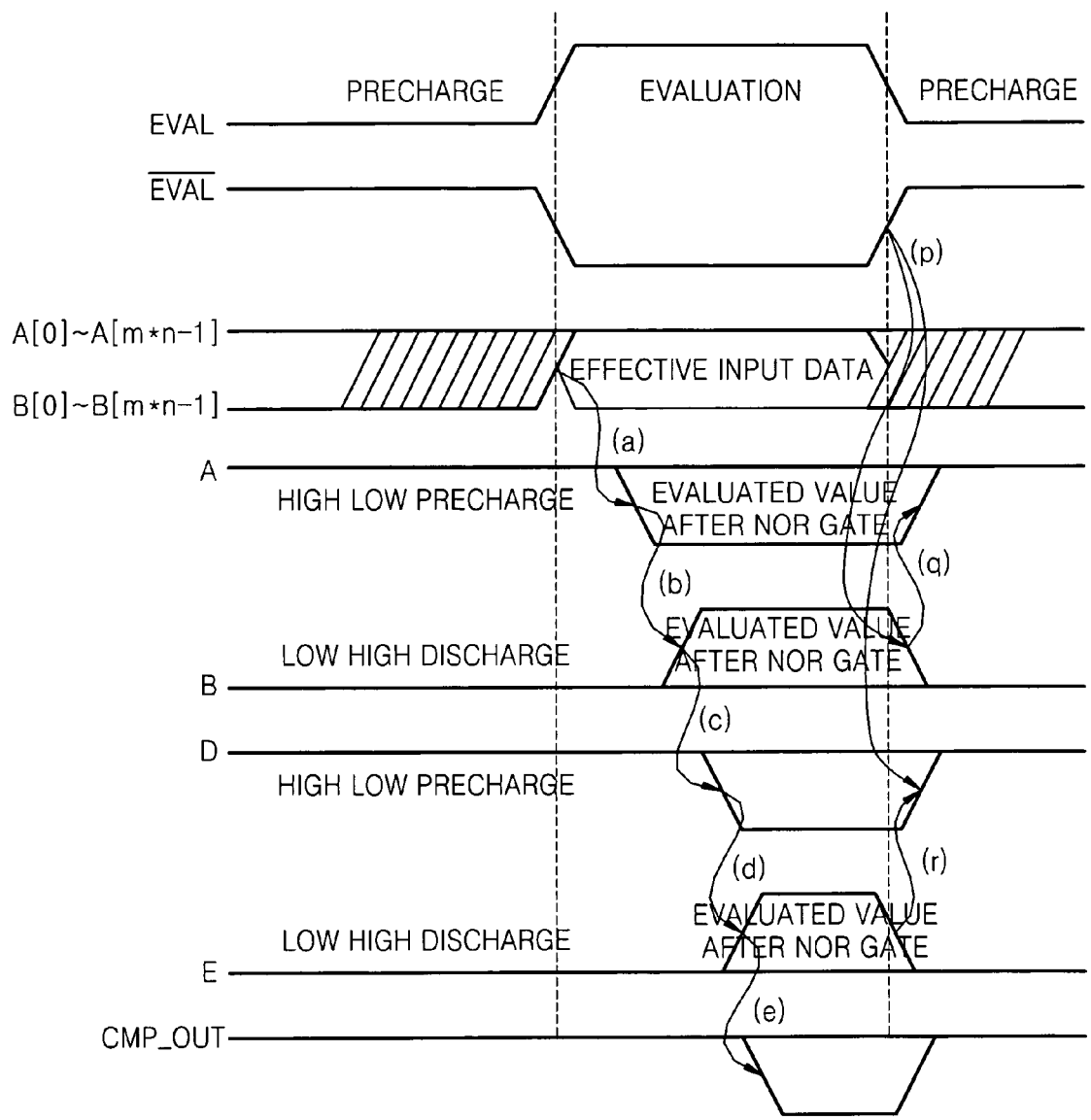
FIG. 7 is a timing diagram of the operations of the comparators shown in FIGS. 3 and 4.

FIG. 7 is a timing diagram of the operations of the comparators shown in FIGS. 3 and 4. Referring to FIG. 7, the first node A shown in FIG. 3 and the first node D shown in FIG. 4 are at the low level (arrow (p)) in the pre-charge mode where the control signal EVAL is at the low level. The output node B shown in FIG. 3 and the output node E shown in FIG. 4 are at the high level (arrow (q), (r)).

In the evaluation mode where the control signal EVAL is changed from the low level to the high level, a comparison operation is performed. The voltage level of the first node A is determined according to whether the input first and second data A[0] and B[0], A[1] and B[1] . . . A[m-1] and B[m-1] and an inversion level of the power level of the first node is output to the output node B. Based on the output node B shown in FIG. 3, the voltage level of the first node D shown in FIG. 4 is determined and an inversion level of the voltage level of the first node D shown in FIG. 4 is output to the output node E, thereby comparing the first data with the second data.

Thus, a comparator according to an embodiment of the present disclosure includes a smaller number of logic circuits and transistors than that of the conventional comparator, thereby reducing the size of the comparator circuit and improving the operating speed of the comparator circuit. In addition, a comparator according to an embodiment of the present disclosure compares data in response to a predetermined control signal based on dynamic logic.

While the present invention has been particularly shown and described with reference to exemplary embodiments thereof, it will be understood by those of ordinary skill in the pertinent art that various changes in form and details may be made therein without departing from the spirit and scope of the present invention as defined by the following claims.

What is claimed is:

1. A comparator for comparing m-bit first data and m-bit second data, the comparator comprising:

m number of bit comparators, each connected between a first node and a second node, comparing each corresponding bit between the first data and the second data, and connecting or disconnecting the first node and the second node;

a charge unit connected between the first node and a first voltage and charging the first node with the first voltage;

a power connection controller disconnecting the second node and a second voltage in a first mode in response to a predetermined control signal and connecting the second node and the second voltage in a second mode, wherein the first node is charged with the first voltage in the first mode and the voltage level of the first node is output as a comparison result in the second mode; and a charge control & output unit outputting an inversion comparison result in response to an inversion control signal and the voltage level of the first node and controlling the operation of the charge unit, wherein the output inversion comparison result of the charge control & output unit is fed back to the charge unit.

2. The comparator of claim 1, wherein each of the m number of bit comparators comprises: a comparison transistor connected between the first node and the second node and operating in response to the comparison result of each corresponding bit between the first data and the second data.

3. The comparator of claim 1, wherein the charge unit is a charge transistor that is connected between the first voltage and the first node and operates in response to a predetermined bias voltage that is input in a gate.

4. The comparator of claim 1, wherein the power connection controller is a connection control transistor that is connected between the second node and the second voltage and operates in response to the control signal that is input in the gate.

5. The comparator of claim 1, wherein the first mode is a pre-charge mode that pre-charges the first node and the second mode is an evaluation mode that outputs a comparison result.

6. The comparator of claim 5, wherein:

at least one of the m number of bit comparators comprises a comparison transistor, and the comparison transistor is an NMOS transistor;

the charge unit comprises a charge transistor, and the charge transistor is a PMOS transistor;

the power connection controller comprises a connection control transistor, and the connection control transistor is the NMOS transistor;

the first voltage is a predetermined power voltage, and the second voltage is a ground voltage; and the m number of bit comparators further comprises an exclusive OR gate that performs an exclusive OR-operation of each corresponding bit between the first data and the second data.

7. The comparator of claim 5, wherein the charge control & output unit is an inversion OR-gate that performs an inversion OR-operation of the inversion control signal and the voltage level of the first node.

8. The comparator of claim 1, wherein the first mode is a discharge mode that discharges the first node and the second mode is an evaluation mode that outputs the comparison result.

9. The comparator of claim 8, wherein:

at least one of the m number of bit comparators comprises a comparison transistor, and the comparison transistor is a PMOS transistor;

the charge unit comprises a charge transistor, and the charge transistor is an NMOS transistor;

the power connection controller comprises a connection control transistor, and the connection control transistor is the PMOS transistor;

the first voltage is a ground voltage and the second voltage is a predetermined power voltage; and the m number of bit comparators further comprises an inversion exclusive OR gate that performs an inversion exclusive OR-operation of each corresponding bit between the first data and the second data.

10. The comparator of claim 8, wherein the charge control & output unit is an inversion AND-gate that performs an inversion AND-operation of the inversion control signal and the voltage level of the first node.

* * * * *